United States Patent
Schopf et al.

(10) Patent No.: US 7,464,483 B2
(45) Date of Patent: **\*Dec. 16, 2008**

(54) PROBE HEAD

(75) Inventors: Reinhold Schopf, Trostberg (DE);
Klaus Groell, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 183 days.

This patent is subject to a terminal disclaimer.

(21) Appl. No.: 11/484,272

(22) Filed: Jul. 10, 2006

(65) Prior Publication Data

US 2007/0006473 A1 Jan. 11, 2007

(30) Foreign Application Priority Data

| Jul. 8, 2005 | (DE) | 10 2005 031 994 |
| May 26, 2006 | (DE) | 10 2006 024 491 |
| May 26, 2006 | (DE) | 10 2006 024 492 |

(51) Int. Cl.
*G01B 7/008* (2006.01)
*G01B 5/008* (2006.01)

(52) U.S. Cl. .............. 33/558; 33/556; 33/561; 33/503; 324/754

(58) Field of Classification Search .......... 33/556, 33/558, 559, 561, 503; 324/754, 72.5
See application file for complete search history.

(56) References Cited

U.S. PATENT DOCUMENTS

| 4,339,714 A * | 7/1982 | Ellis .................. 324/207.16 |
| 4,513,507 A * | 4/1985 | Laskowski .................. 33/558 |
| 4,528,758 A * | 7/1985 | Berchtold .................. 33/558 |
| 4,654,956 A * | 4/1987 | Reed et al. .................. 483/55 |
| 4,716,657 A | 1/1988 | Collingwood |
| 5,109,223 A * | 4/1992 | Schmitt et al. .......... 340/870.31 |
| 5,150,529 A * | 9/1992 | Collingwood .................. 33/503 |
| 5,326,982 A * | 7/1994 | Wiklund .................. 250/559.19 |
| 5,564,872 A | 10/1996 | Veil et al. |
| 5,623,766 A * | 4/1997 | Ruck et al. .................. 33/561 |
| 6,526,670 B1 | 3/2003 | Carli |
| 6,840,723 B2 * | 1/2005 | Jacobsson .................. 409/231 |
| 6,951,060 B2 * | 10/2005 | Groell .................. 33/558 |
| 6,984,999 B2 | 1/2006 | Groell |

(Continued)

FOREIGN PATENT DOCUMENTS

| DE | 10 2004 003 487 | 8/2005 |
| EP | 0 217 808 | 4/1989 |
| EP | 1 179 173 | 9/2003 |

*Primary Examiner*—G. Bradley Bennett
*Assistant Examiner*—Amy Cohen Johnson
(74) *Attorney, Agent, or Firm*—Kenyon & Kenyon LLP (57) ABSTRACT

A probe head includes a feeler, a sensor unit, a CPU, a transmitting stage and a producer of electrical energy for supplying energy to the sensor unit, to the CPU and to the transmitting stage. An electrical signal is triggerable by the sensor unit in response to a deflection of the feeler which is convertible in the transmitting stage into an electromagnetic signal. The producer of electrical energy includes a turbine having rotor disk rotatable about an axis. Magnets are mounted on the rotor disk of the turbine, which are arranged across from stationary electrically conductive windings at an axial distance. The probe head includes a voltage transformer, at the output of which an output voltage is producible, which is greater than the input voltage applied to the voltage transformer, the output voltage being used to supply energy to the transmitting stage.

30 Claims, 9 Drawing Sheets

U.S. PATENT DOCUMENTS 7,145,468 B2 * 12/2006 Collingwood et al. ....... 340/680
7,228,642 B2 * 6/2007 Enderle et al. ................ 33/561
7,316,077 B2 * 1/2008 Fuge et al. .................... 33/559
2005/0172506 A1 * 8/2005 Collingwood et al. ......... 33/561
2007/0068025 A1 * 3/2007 Harding et al. ................ 33/561
2008/0110039 A1 * 5/2008 Groell et al. ................... 33/558

* cited by examiner

PROBE HEAD

CROSS-REFERENCE TO RELATED APPLICATIONS

This application claims priority to application No. 10 2005 031 994.7, filed in the Federal Republic of Germany on Jul. 8, 2005, application No. 10 2006 024 491.5, filed in the Federal Republic of Germany on May 26, 2006, and application No. 10 2006 024 492.3, filed in the Federal Republic of Germany on May 26, 2006, each of which is expressly incorporated herein in its entirety by reference thereto.

FIELD OF THE INVENTION

The present invention relates to a probe head, which may be particularly suited for operation without a battery.

BACKGROUND INFORMATION

Probe systems are used, for example, for determining the positions of workpieces which are clamped into material-working machines such as milling machines, for example. These probe systems frequently have a stationary transceiver unit, which is mounted on a permanently installed element of the material-working machine, and a part that is movable or mobile with respect to the latter, which is frequently referred to as a probe head. The probe head is for the most part mounted on a movable element of the material-working machine, for example, on a milling spindle. In this context, the probe head includes a feeler that is deflectable out of a rest position or a deflectable probe element, which produces a switching signal in response to a deflection out of its rest position. The rest position of the probe element is understood to be a position where the probe element does not have any contact with a workpiece. In response to contact of the probe element with the workpiece, the probe element is deflected out of its rest position.

In so-called wireless probe systems, the corresponding switching signal is transmitted from the probe head as an electromagnetic signal, e.g., as an infrared signal, to the stationary transceiver unit. In the transceiver unit, the output signals of the probe system are analyzed in order to determine the occurrence of switching signals (i.e., a deflection of the probe element). Thus, frequently there is no cable connection between the probe head and the stationary transceiver unit.

For its energy supply, such a probe head often has a direct-current source in the form of one or more batteries. There is believed to be a constant desire to increase the availability of such probe systems, which is why there is an effort to maximize the service life of the direct-current sources.

European Published Patent Application No. 1 179 173, for example, describes a battery-operated probe head, which may prolong the service life of the batteries by various measures, which may ultimately improve the availability of the respective probe system because of less frequent standstill times due to exhausted batteries.

European Published Patent Application No. 0 217 808 and U.S. Pat. No. 5,564,872 provide for equipping a probe head with a turbine and a generator in order to produce electrical energy for operating the probe head by applying compressed air. Conventional systems are used as generators. Such devices require a comparatively large amount of space.

SUMMARY

Example embodiments of the present invention may provide a probe head, in which the availability of a probe system is increased, which may be operated at minimal maintenance costs and may be manufactured having extremely small outer dimensions.

Improved use of electrical energy produced in the probe head may be possible.

The probe head includes, in addition to a feeler, an electrical circuit, which has assigned to it, among other things, a sensor unit, a CPU (central processing unit) and a transmitting stage. Furthermore, the probe head has a producer of electrical energy for the energy supply of the mentioned elements of the circuit. In response to a deflection of the feeler, the sensor unit is able to trigger an electrical signal, which in the transmitting stage is convertible into an emittable electromagnetic signal. This signal is receivable by a stationary transceiver unit. For this purpose, the producer of electrical energy is capable of being operated with the aid of a pressurized fluid and includes a turbine having a rotor disk rotatable about an axis. Magnets are mounted on the turbine's rotor disk, which are arranged across from stationary electrically conductive windings at an axial distance. Accordingly, between the magnets and the windings there is an air gap that has an axial extension with respect to the axis of the rotor disk. The air gap between the magnet and the rotor disk is thus located on a front side of the rotor disk. This arrangement may allow for an extremely compact construction of the probe head. Since the electrically conductive windings are stationary, i.e., immovable, a very low-maintenance or entirely maintenance-free construction may be achieved.

The probe head may include a voltage transformer, at the output of which an output voltage is producible which is greater than the input voltage applied to the voltage transformer, the output voltage of the voltage transformer being used to supply energy to the transmitting stage.

The probe head may include, in addition to a feeler, an electrical circuit, which has assigned to it, among other things, a sensor unit, a CPU (central processing unit) and a transmitting stage. Furthermore, the probe head has a producer of electrical energy for the energy supply of the mentioned elements of the circuit. In response to a deflection of the feeler, the sensor unit is able to trigger an electrical signal, which in the transmitting stage is convertible into an emittable electromagnetic signal. This signal is receivable by a stationary transceiver unit. Furthermore, according to another aspect, the probe head includes a voltage transformer, at the output of which an output voltage is producible which is greater than the input voltage applied to the voltage transformer, the output voltage being used to supply energy to the transmitting stage. This may allow for an optimal utilization of the produced electrical energy in the probe head.

Fluids include a gas, e.g., air or compressed air. Alternatively, a liquid such as a cooling liquid, as is used for example in machine tools, may also be used as a fluid.

The producer of electrical energy may include a turbo engine, which drives a generator, for example. The turbo engine may be arranged as a turbine. For this purpose, the turbine may be configured such that the fluid flows parallel to the axis of a rotating component, which frequently takes the form of a rotor disk, or alternatively flows orthogonally (in a tangential direction) with respect to it. The turbine may have a diagonal flow-through direction. That is to say that the fluid experiences a flow direction which has a tangential and an axial directional component with respect to the axis of rotation of the rotating component.

The rotor disk or the rotating component may be supported by a rolling bearing in the probe head or by a sliding bearing, the rotor disk or the rotating component being configured as a plastic part or an aluminum part which has a low coefficient of friction such that, in the construction from plastic, a sliding bearing may be used (as a bore hole in the point of rotation of the rotor disk or rotating component). Furthermore, the bearing may be lubricated by the fluid itself. For example, when using gas, e.g., compressed air, an extremely low-friction air bearing may be utilized for supporting the rotor disk or the rotating component in the probe head.

The magnets, which may take the form of permanent magnets or solenoids for example, may be integrated into the rotor disk or into the rotating component. For example, the magnets may be arranged such that they do not project from the outer contour of the rotor disk or of the rotating component.

At least one of the magnets may be arranged such that the connecting line of the two poles has a directional component parallel to the axis of rotation of the rotor disk or of the rotating component. In other words, the field lines from the two poles of a magnet arranged in the rotor disk or in the rotating component emerge from the magnet having a directional component parallel to the axis of rotation of the rotor disk or of the rotating component.

The stationary electrically conductive windings may take the form of a wire winding, for example.

The probe head may be constructed such that the fluid flowing out of the producer of electrical energy, for example, air, may be used for cleaning a measuring point. For this purpose, appropriate flow channels are provided in the probe head, which conduct the fluid to the measuring point without the occurrence of an unacceptably high loss of pressure. Since the discharging fluid, for example, the air, is not conducted directly into the surroundings, but rather through the flow channels, an additional advantage may be obtained in that the operation of the producer of electrical energy may be very quiet. That is, the flow channels may have a noise-damping effect.

The probe head may include an energy storage mechanism for storing the produced electrical energy. Such an energy storage mechanism, for example, may be a rechargeable accumulator or a buffer capacitor. For this purpose, double-layer capacitors, also referred to as electrochemical double-layer capacitors (EDLC), such as are marketed under the brand names Goldcaps, Supercaps or Ultracaps, may be used as buffer capacitors.

Alternatively, the energy produced may also be stored by mechanical device(s), for example, by a spring or in the form of rotational energy of the rotor disk or of the rotating component of the turbo engine, which then operates as a flywheel. This stored mechanical energy may be converted later into electrical energy.

Example embodiments of the present invention, however, also include a probe head without energy storage mechanism, in which the producer of electrical energy is in operation during the measuring operation.

The probe head may be configured such that an input voltage applied to the voltage transformer corresponds to the output voltage of the producer of electrical energy or to the output voltage of the energy storage mechanism for storing the electrical energy produced.

Frequently, the probe head is also usable when the producer of electrical energy is switched off. In this instance, the voltage transformer may be capable of transforming the output voltage on the energy storage mechanism such that the available use time is extended. The outer dimensions of such a probe head are not larger than those of a probe head operated by batteries.

The probe head may be configured such that, while the producer of electrical energy is in operation, the current produced may be supplied both to the energy storage mechanism as well as to the loads, i.e., to the sensor unit or to the CPU or to the transmitting stage. In this manner, the probe head may commence its operation without any time delay immediately after the fluid is applied to the rotor disk or the rotating component. The charge time of the energy storage mechanism then does not play any role since this is charged parallel to the supply of the sensor unit, the CPU or the transmitting stage. For example, an electronics may be provided in this connection in the probe head, which automatically opens a bypass to the sensor unit, the CPU or the transmitting stage for a portion of the produced current in the event that the energy storage mechanism is not fully charged. The excess current that is then still produced is used to charge the energy storage mechanism.

Conventional probe heads frequently have a receiving stage, which is capable of receiving electromagnetic signals from a stationary transceiver unit and then prompts appropriate reactions in the probe head. Frequently, the reaction to the received command is limited merely to the functionality of activating or deactivating the probe head. In an example embodiment of the present invention, the activation (switching-on) is achieved by applying the pressurized fluid, e.g., by applying compressed air, to the probe head. By switching off the compressed air, the feeler is then again deactivated, it being possible when using an energy storage mechanism in the probe head that, depending on the installed storage capacity, a corresponding time interval passes before the final deactivation. The probe head may allow for a receiving stage in the probe head to be omitted.

Thus the design approach hereof may increase the availability of a probe system and/or reduce standstill or set-up times. The probe head may be provided such that it works completely self-sufficiently in terms of energy such that a change of batteries is never required.

According to an example embodiment of the present invention, a probe head includes: a feeler; a sensor unit; a CPU; a transmission stage; and a producer of electrical energy adapted to supply energy to the sensor unit, the CPU and the transmission stage, an electrical signal triggerable by the sensor unit in response to a deflection of the feeler, the electrical signal convertible in the transmission stage into an electromagnetic signal, the producer of electrical energy including a turbine having a rotor disk rotatable about an axis and operable by a pressurized fluid, magnets mounted on the rotor disk of the turbine and arranged across from stationary electrically conductive windings at an axial distance.

The magnets may be integrated into the rotor disk.

The magnets may be arranged as permanent magnets.

A connecting line of poles of one of the magnets may have a directional component parallel to the axis of the rotor disk.

The turbine may be arranged such that the fluid includes a tangential flow-through direction.

The fluid may flow out of the producer of electrical energy, and flow channels in the probe head may be configured such that discharging fluid is usable to clean a measuring point of the feeler.

The fluid may include compressed air.

The probe head may include an energy storage device adapted to store produced electrical energy.

The energy storage device may include a capacitor.

The probe head may include a voltage transformer, and an input voltage applied to the voltage transformer may correspond to one of (a) an output voltage of the producer of electrical energy and (b) an output voltage of the energy storage device.

The probe head may include a voltage transformer adapted to produce an output voltage at an output, the output voltage may be greater than an input voltage applied to the voltage transformer, and the output voltage may be arranged to supply energy to the transmission stage.

The producer of electrical energy may be adapted to supply current produced during its operation to an energy storage device and to at least one of (a) the sensor unit, (b) the CPU and (c) the transmission stage.

The probe head may include control electronics adapted to short circuit the stationary electrically conductive windings to limit a rotational speed of the rotor disk.

The probe head may be activatable by application of the pressurized fluid.

According to an example embodiment of the present invention, a probe head includes: a feeler; a sensor unit; a CPU; a transmission stage; a producer of electrical energy adapted to supply energy to the sensor unit, the CPU and the transmission stage, an electrical signal triggerable by the sensor unit in response to a deflection of the feeler, the electrical signal convertible in the transmission stage into an electromagnetic signal, the producer of electrical energy operable by a pressurized fluid; and a voltage transformer adapted to produce an output voltage at an output, the output voltage greater than an input voltage applied to the voltage transformer, the output voltage used to supply energy to the transmission stage.

The probe head may include an energy storage device adapted to store electrical energy produced.

The energy storage device may include a capacitor.

The input voltage applied to the voltage transformer may correspond to one of (a) an output voltage of the producer of electrical energy and (b) an output voltage of the energy storage device.

Current produced during operation of the producer of electrical energy may be supplyable to the energy storage mechanism and to one of (a) the sensor unit, (b) the CPU and (c) the transmission stage.

The producer of electrical energy may include a turbo engine.

The turbo engine may be arranged as a turbine.

The turbine may be configured such that the fluid includes a tangential flow-through direction.

Magnets may be arranged on a rotating component of the turbo engine and across from stationary electrically conductive windings.

The magnets may be arranged as permanent magnets.

The turbine may include a rotor disk rotatable about an axis, and magnets may be mounted on the rotor disk arranged across from stationary electrically conductive windings at an axial distance.

A connecting line of poles of one of the magnets may include a directional component parallel to the axis of the rotor disk.

The probe head may include control electronics adapted to short circuit the stationary electrically conductive windings to limit a rotational speed of the turbo engine.

The fluid may flow out of the producer of electrical energy, and flow channels in the probe head may be configured such that discharging fluid is usable to clean a measuring point of the feeler.

The fluid may include compressed air.

An activation of the probe head may be achievable by application of the pressurized fluid to the probe head.

Further details and aspects of a probe head according to example embodiments of the present invention are described in more detail below with reference to the appended Figures.

DETAILED DESCRIPTION

Figure 1:
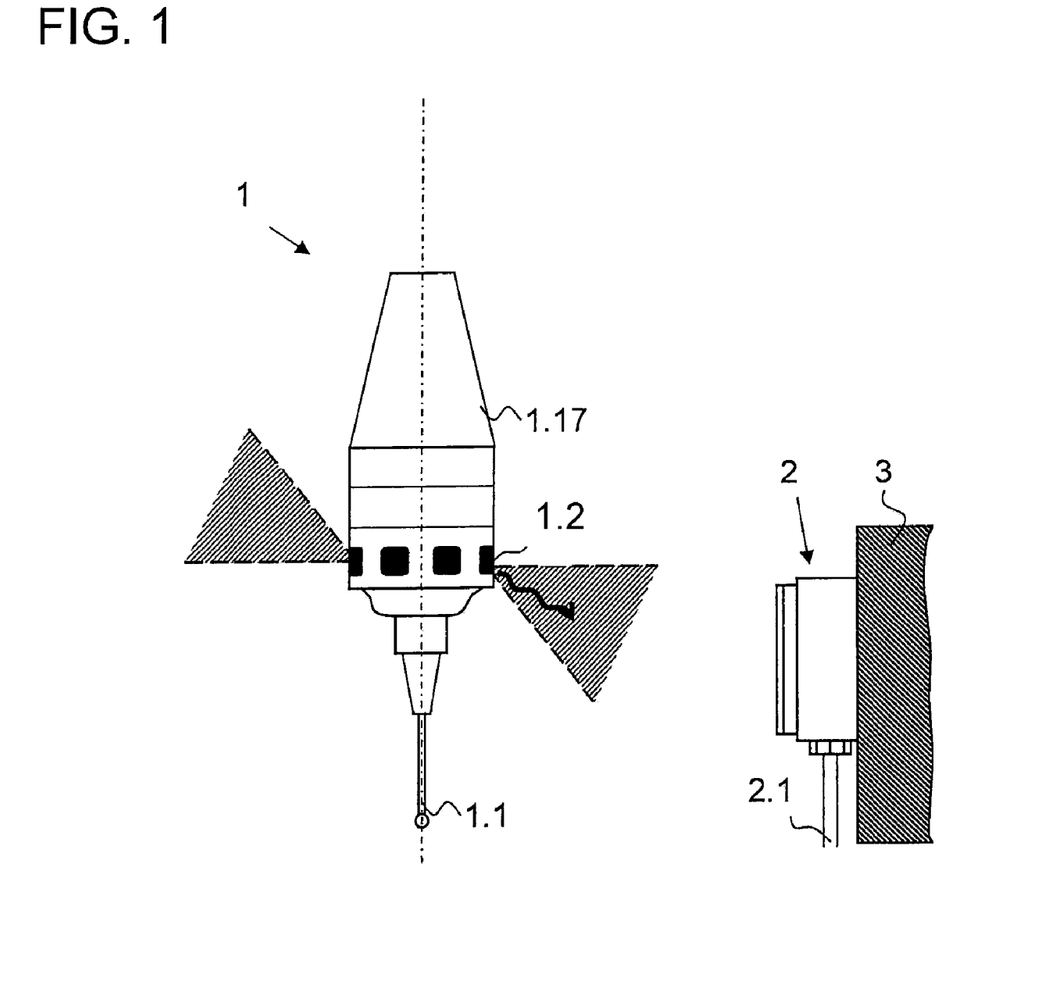
FIG. 1 is a schematic view of a probe system.

FIG. 1 illustrates a probe head 1 which may be clamped into a machine tool by a clamping cone 1.17. For the measuring function, a cylindrical feeler 1.1 having a probing contact sphere at one end is provided on probe head 1.

The probe system also includes a receiver unit 2 which is fixed in position on a stationary component 3 of the machine tool such that probe head 1 is thus mobile with respect to receiver unit 2, i.e., is movable relative to the latter.

In the exemplary embodiment illustrated, six receiver elements 1.2 distributed over the circumference of probe head 1 are provided, each secured in a manner offset by 60° along a circumferential line on probe head 1. With the aid of receiver elements 1.2, electromagnetic signals, e.g., infrared signals, may be emitted which are able to be received by receiver unit 2.

Figure 2:
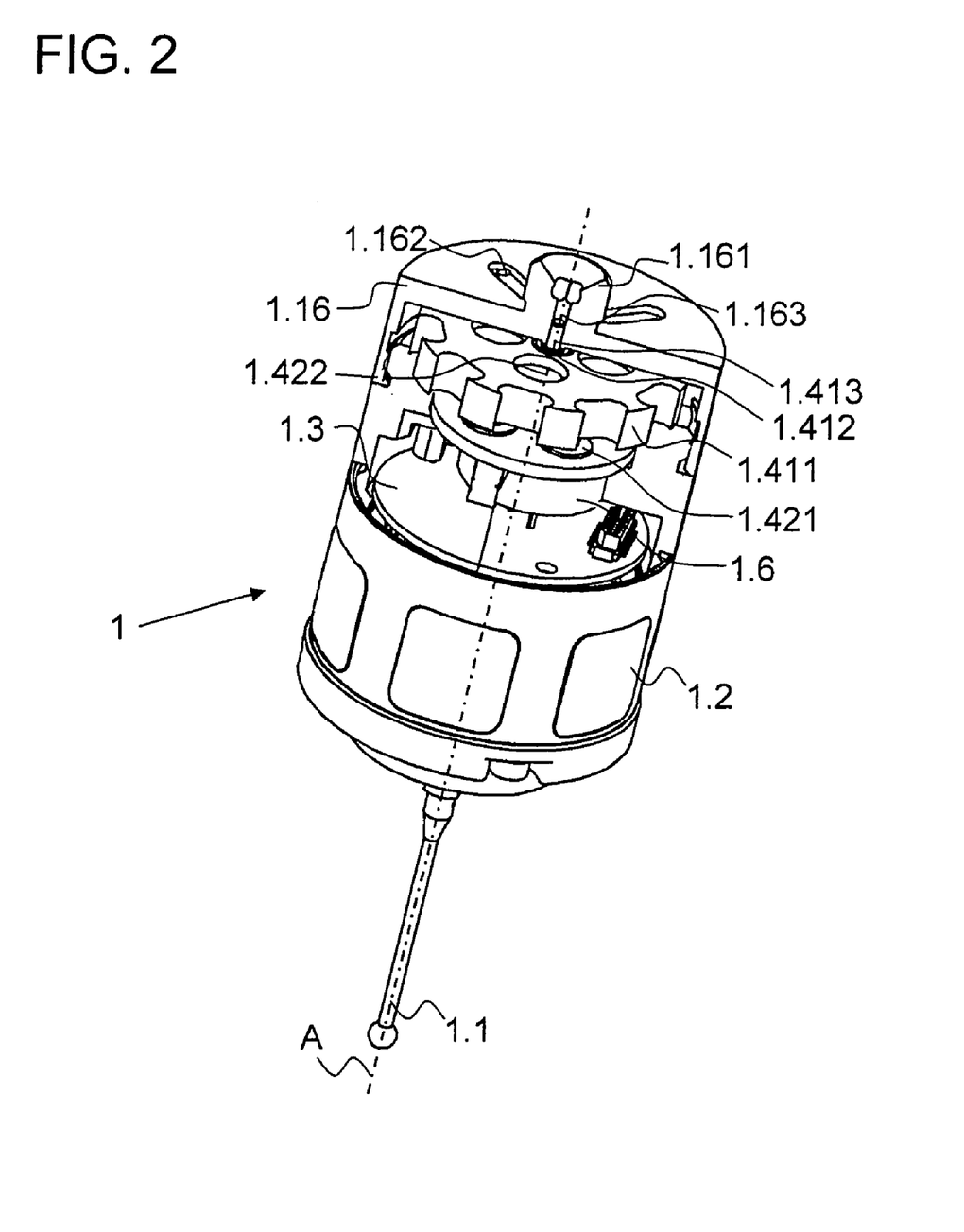
FIG. 2 is a perspective view of a probe head according to an example embodiment of the present invention.

FIG. 2 is a perspective view of probe head 1, partially in cross-section, without clamping cone 1.17. Probe head 1 includes a cap 1.16 having a fastening thread 1.161 to which clamping cone 1.17 may be screwed. Furthermore, four compressed air feeds 1.162 are provided in cap 1.16 which are constructed as slanted bore holes through the wall of cap 1.16. Cap 1.16 moreover has a central bore hole 1.163.

As schematically illustrated in FIGS. 7 to 10, a producer 1.4 of electrical energy in the form of a turbine 1.41 in combination with a generator 1.42 is housed in cap 1.16. As illustrated in FIG. 2, the turbo engine arranged as turbine 1.41 includes as rotating component a rotor disk 1.411, the rotor disk being rotatable about an axis A and being rotatably supported with respect to a fixed pivot 1.413, e.g., by a rolling bearing 1.412. Pivot 1.413 rests in central bore hole 1.163 of cap 1.16. Generator 1.42 is made up of stationary electrically conductive windings, here in the form of windings 1.421 made of wire, e.g., copper wire, and four magnets 1.422, which are integrated into rotor disk 1.411. Magnets 1.422 are arranged as permanent magnets. In FIGS. 7 to 10, the usual symbolic representation is indicated for producer 1.4 of electrical energy even though in the illustrated exemplary embodiment no shaft is tangibly present between turbine 1.41 and generator 1.42. Accordingly, magnets 1.42 are mounted on rotor disk 1.411 of turbine 1.41, which are arranged across from stationary electrically conductive windings 1.421 at an axial distance with respect to axis A of rotor disk 1.411.

Below windings 1.421 there is a buffer capacitor 1.6, which is arranged as a double-layer capacitor in the exemplary embodiment illustrated and is available under the brand name Goldcap. Such a buffer capacitor 1.6 is capable of storing a comparatively large amount of electrical energy at a relatively low voltage.

FIG. 2 illustrates a circuit board 1.3 on which various electronic components of a circuit S are mounted.

Normally, probe head 1 is clamped by its clamping cone 1.17 into a machine tool which is supplied with compressed air. Immediately prior to the actual measuring process, when probe head 1 has already been moved near the measuring point, the measuring point is blown off using compressed air in order to prevent shavings, etc., that may be lying about from interfering with the measurement. As a pressurized fluid, the compressed air is conducted through clamping cone 1.17 into compressed air feeds 1.162. In compressed air feeds 1.162, the compressed air is redirected such that it meets the outer circumference of rotor disk 1.411 tangentially and having an axial directional component at an angle and thus sets it in rotation. In this state, an electric voltage and an electric current is produced in windings 1.421, i.e., electrical energy is generated. This is used to charge buffer capacitor 1.6. The application of the compressed air for flowing through probe head 1 is incidentally at the same time also the triggering event which activates probe head 1.

In the actual measuring operation, which follows directly upon the blowing-off process, the compressed air supply is switched off so as not to interfere with the measurement. During this time, the energy stored in buffer capacitor 1.6 is used to supply the electronic components in probe head 1. If feeler 1.1 is deflected, the transmission of a corresponding signal from probe head 1 to receiver unit 2 is effected.

Figure 3:
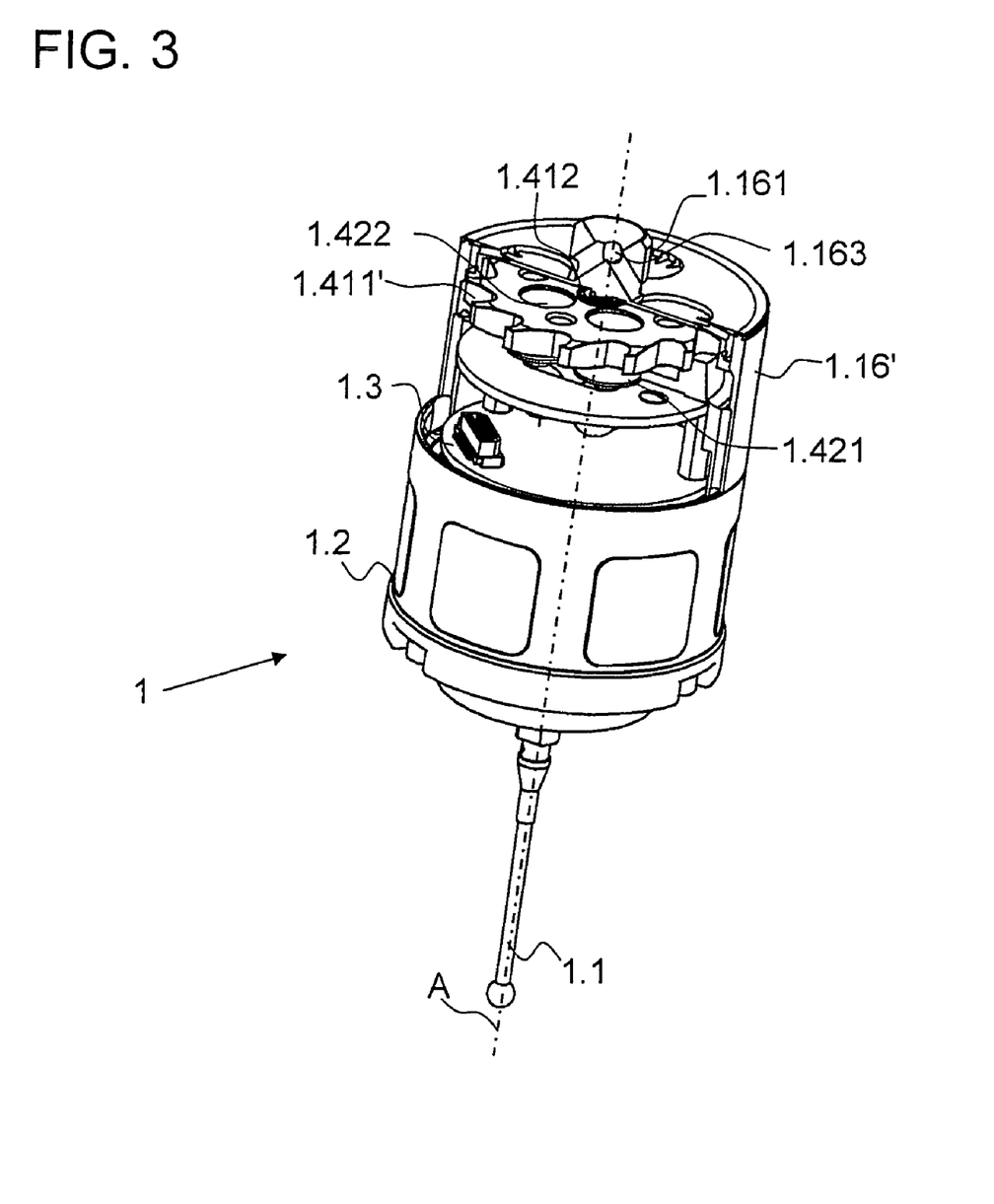
FIG. 3 is a perspective view of a probe head of an example embodiment of the present invention.

FIG. 3 illustrates a probe head according to an example embodiment of the present invention. The main difference with respect to the construction described above is in that turbine 1.41 is configured such that the compressed air has a tangential flow-through direction. For this purpose, in this example, cap 1.16' has compressed air feeds which are aligned such that the compressed air flows tangentially to rotor disk 1.411'. These bore holes are distributed in four locations across the circumference of cap 1.16' or rotor disk 1.411'.

Figure 4:
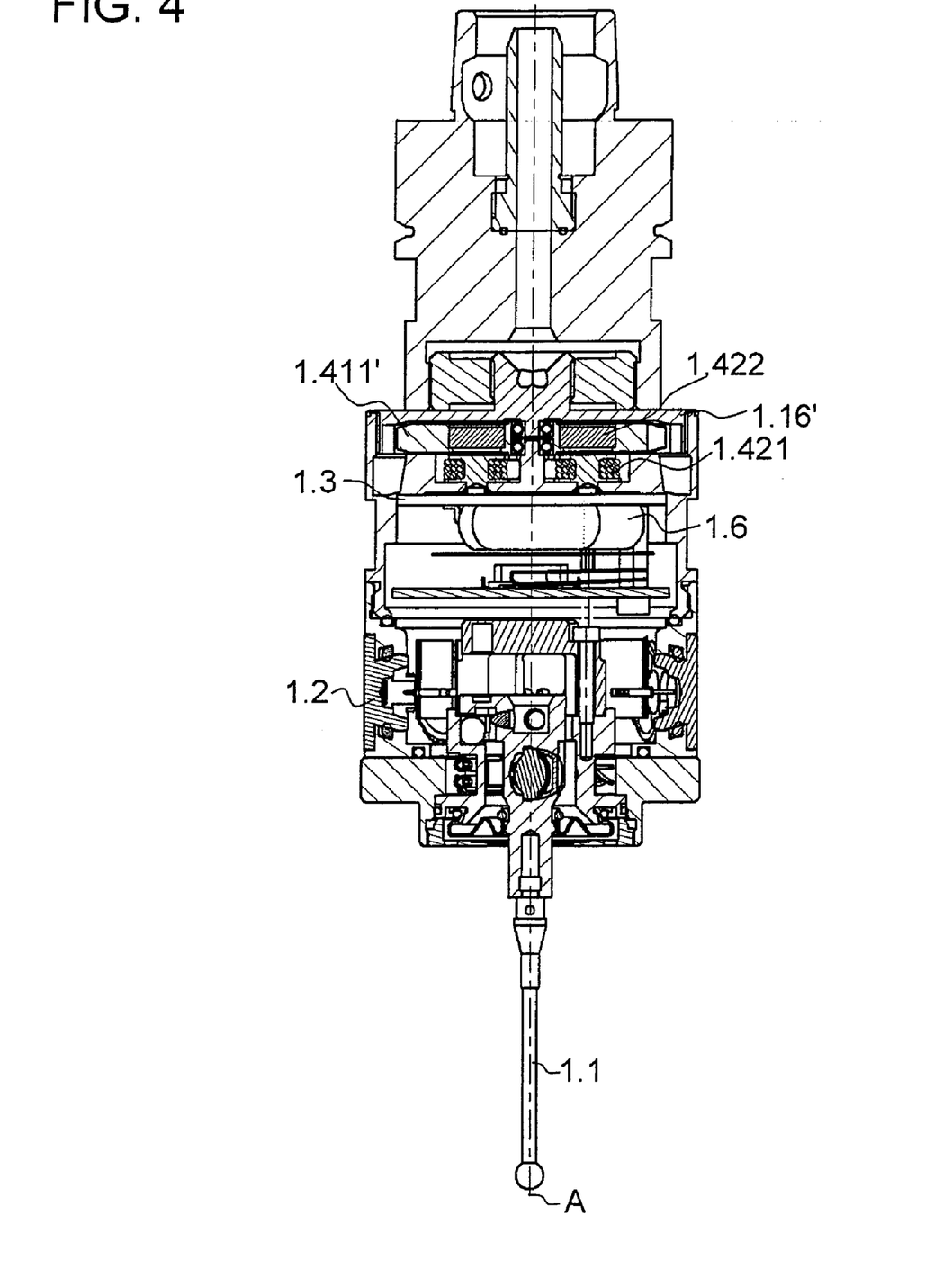
FIG. 4 is a cross-sectional view of the probe head illustrated in FIG. 3.

FIG. 4 illustrates probe head 1 in a longitudinal cross-sectional view. Although, in probe head 1 illustrated in FIG. 4, flow channels are also provided, which are configured such that the fluid flowing out of turbine 1.41 may be used for cleaning a measuring point, these flow channels illustrated in FIG. 4 are not in the relevant sectional planes and are thus not visible.

Figure 5:
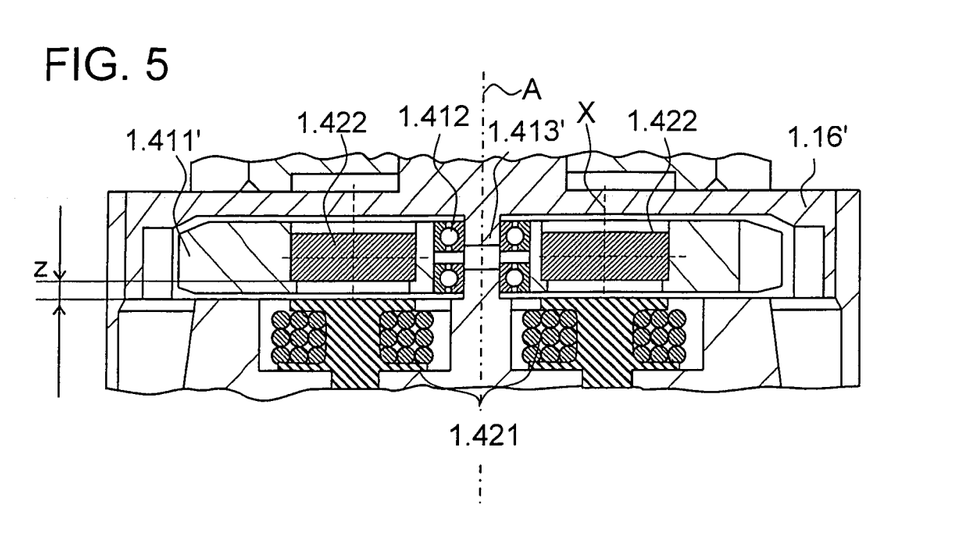
FIG. 5 is an enlarged detail view of the cross-sectional view of FIG. 4.

FIG. 5 is a detailed view of the longitudinal cross-sectional view of FIG. 4 in the region of rotor disk 1.411' and windings 1.421. Pivot 1.413' is an integral component of cap 1.16'. As in the construction illustrated in FIG. 2, magnets 1.422 are also mounted on rotor disk 1.411', which are arranged across from stationary electrically conductive windings 1.421 at an axial distance. In FIG. 5, the distance is indicated by symbol z.

Figure 6A:
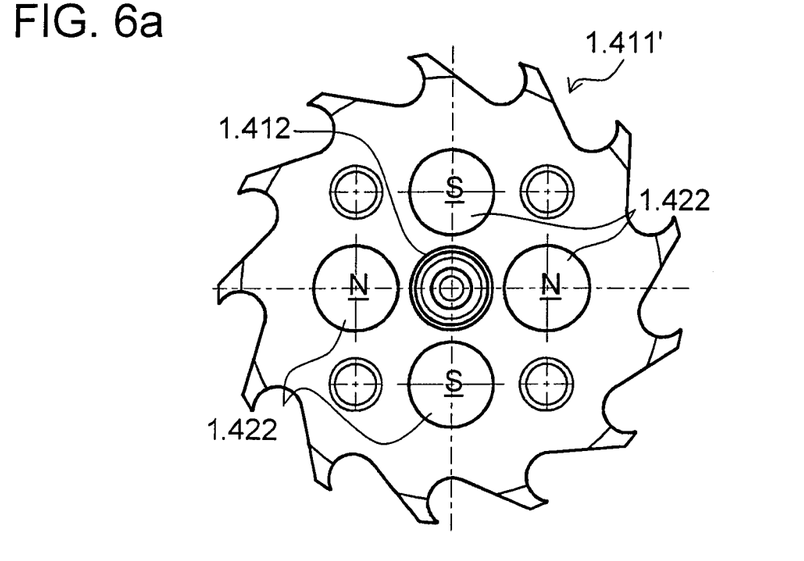
FIG. 6*a* is a top view of the rotor disk of the probe head illustrated in FIG. 3.

FIG. 6a is a top view of rotor disk 1.411'. Rotor disk 1.411' may have, e.g., thirteen blades. As mentioned above, compressed air is supplied tangentially to rotor disk 1.411' at four points distributed across the circumference. To avoid conditions of vibration, the number of blades may be selected such that it is not integrally divisible by the number of points at which compressed air is supplied. Furthermore, four magnets 1.422 are arranged in an integrated manner in rotor disk 1.411'. Magnets 1.422 are built into rotor disk 1.411' such that they do not project from the outer contour or the front sides of rotor disk 1.411'. The poles of magnets 1.422 all point to the front side of rotor disk 1.411', adjacent magnets 1.422 across the circumference having in each case a contrary pole alignment (see also FIG. 6b). The arrangement illustrated in FIG. 2 also features such an arrangement of magnets 1.422 as well as their pole orientation.

Figure 6B:
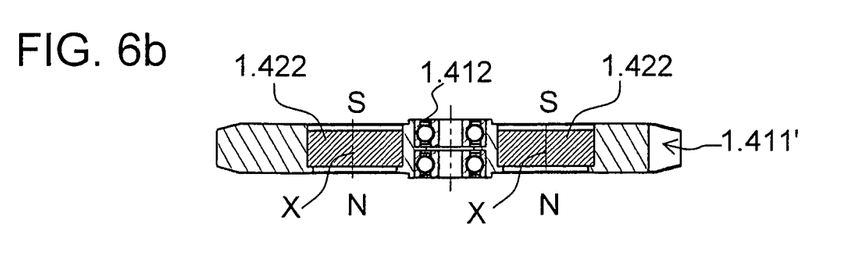
FIG. 6*b* is a cross-sectional view of the rotor disk illustrated in FIG. 6*a*.

A connecting line X of poles N, S of magnets 1.422 has a directional component parallel to axis A of rotor disk 1.411, 1.411'. In the exemplary embodiments illustrated, connecting lines X are parallel to axis A.

Due to the arrangement of probe head 1, the rotor disk 1.411, 1.411' of which has magnets 1.422 which are arranged across from stationary electrically conductive windings 1.421 at an axial distance z, it is possible to achieve an extremely compact construction that requires little space. This effect is additionally reinforced in that rotor disk 1.411, 1.411' as part of turbine 1.41 with magnets 1.411, 1.411' also includes parts of generator.1.42.

This construction makes it furthermore possible to arrive at a hermetically sealed arrangement. It is thus possible to avoid feeding through a shaft for generator 1.42. For example, it is possible to keep the compressed air safely away from circuit board 1.3 and the electronic components arranged on it and from the actual sensor elements (in the lower part of probe head 1 illustrated in FIG. 4). This may be particularly significant if the compressed air includes residues of lubricant.

Figure 7:
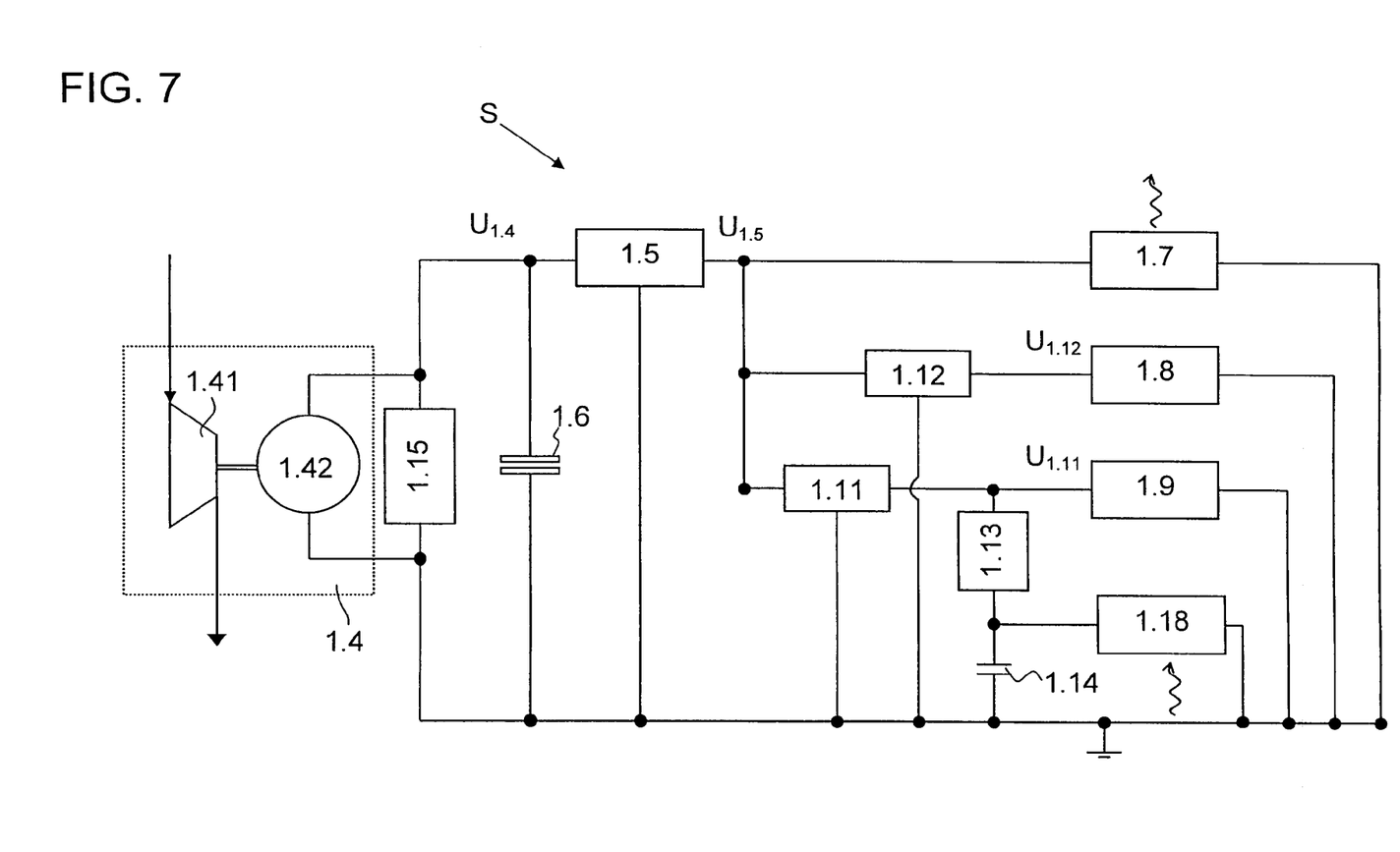
FIG. 7 is a schematic circuit diagram of an electrical circuit of the probe head.

FIG. 7 is a simplified circuit diagram of circuit S as, according to an exemplary embodiment, is arranged within probe head 1 partially on circuit board 1.3. Circuit 5 includes producer 1.4 of electrical energy, which includes turbine 1.41 and generator 1.42. When operating producer 1.4 of electrical energy, a pulsating direct voltage $U_{1.4}$ is built up with the support of an appropriate rectifier electronics on generator 1.42. An overload protection circuit 1.15 is provided so that no unacceptably high direct voltage $U_{1.4}$ is produced at a high rotational speed of rotor disk 1.411. During the time in which generator 1.42 produces current, buffer capacitor 1.6 is charged. For this purpose, the negative pole of generator 1.42 is connected to ground.

As soon as turbine 1.41 and generator 1.42 are again at a standstill following the disconnection of the compressed air, buffer capacitor 1.6 is used for supplying power to, among other things, a sensor unit 1.8, a CPU 1.9 and a transmitting stage 1.7. Circuit S also includes an RC filter circuit that includes a resistor 1.13 and a capacitor 1.14 for supplying a receiving stage 1.18. As a variation of circuit S, it is possible to omit receiving stage 1.18. For example, the probe head may be switched on exclusively by applying the compressed air, rather than by removing an actuation signal from receiving unit 2.

A voltage transformer 1.5 is connected between producer 1.4 of electrical energy or buffer capacitor 1.6 and transmitting stage 1.7.

As illustrated in FIG. 7, circuit S also includes two voltage limiters 1.11, 1.12 which supply output voltages $U_{1.11}$, $U_{1.12}$ that are used at the same time as input voltage for sensor unit 1.8 and for CPU 1.9, respectively.

If feeler 1.1 is deflected while in measuring operation, a digital signal (change of a voltage level from high to low) is produced in sensor unit 1.8. This signal is transmitted to CPU 1.9 where it is further processed. The signal, further processed by the CPU, is then routed to transmitting stage 1.7, which generates the transmission signal in the form of electromagnetic rays or signals. The electromagnetic signals may take the form of infrared signals. However, radio signals, for example, may also be used. The signals are received by stationary transceiver unit 2. Inside receiver unit 2, the infrared signals are converted into electrical signals and conditioned.

The conditioned electrical signals arrive via a cable 2.1 at a stationary sequential electronics, where they are further processed.

When the compressed air is switched off, following a certain operating time, direct voltage $U_{1.4}$ may fall below a value required for operating probe head 1. For example, for proper operation, transmitting stage 1.7 may require an input voltage $U_{1.5}$ of, e.g., more than 5 V. In the exemplary embodiment illustrated, the setpoint operating voltage for transmitting stage 1.7 is at 5.5 V. Direct voltage $U_{1.4}$, which in this phase of the exemplary embodiment should amount to 4.5 V, is increased by voltage transformer 1.5 to $U_{1.5}$=5.5 V. Thus, the probe system may continue to be operated even at a comparatively low direct voltage $U_{1.4}$. This increases the possible operating time of probe head 1.

Voltage limiter 1.12 reduces voltage $U_{1.5}$=5.5 V to a voltage $U_{1.12}$=2.8 V, as is necessary for the operation of sensor unit 1.8. In addition to the function of voltage reduction, voltage limiter 1.12 moreover has the capacity to smooth voltage $U_{1.12}$ applied to the input of sensor unit 1.8, which may be of significance for the measuring performance of probe head 1.

CPU 1.9 is supplied with a voltage $U_{1.11}$ of, e.g., 2.8 V. Therefore, a suitable voltage limiter 1.11, which reduces voltage $U_{1.5}$=5.5 V to 2.8 V, is connected in incoming circuit to CPU 1.9.

Voltage transformer 1.5 may provide that voltage U is at least 5 V. Therefore, it may also be provided that input voltage $U_{1.12}$ of sensor unit 1.8 is able to be reduced to the requisite 2.8 V by voltage limiter 1.12.

An analogous consideration applies also to the voltage supply of CPU 1.9. Here as well, a reduction of voltage $U_{1.5}$ to the requisite input voltage $U_{1.11}$ of 2.8 V is attainable by voltage limiter 1.11. Voltage limiter 1.11 also has the capacity to smooth the voltage with respect to voltage $U_{1.5}$, which is an advantage for the operation of CPU 1.9.

Figure 8:
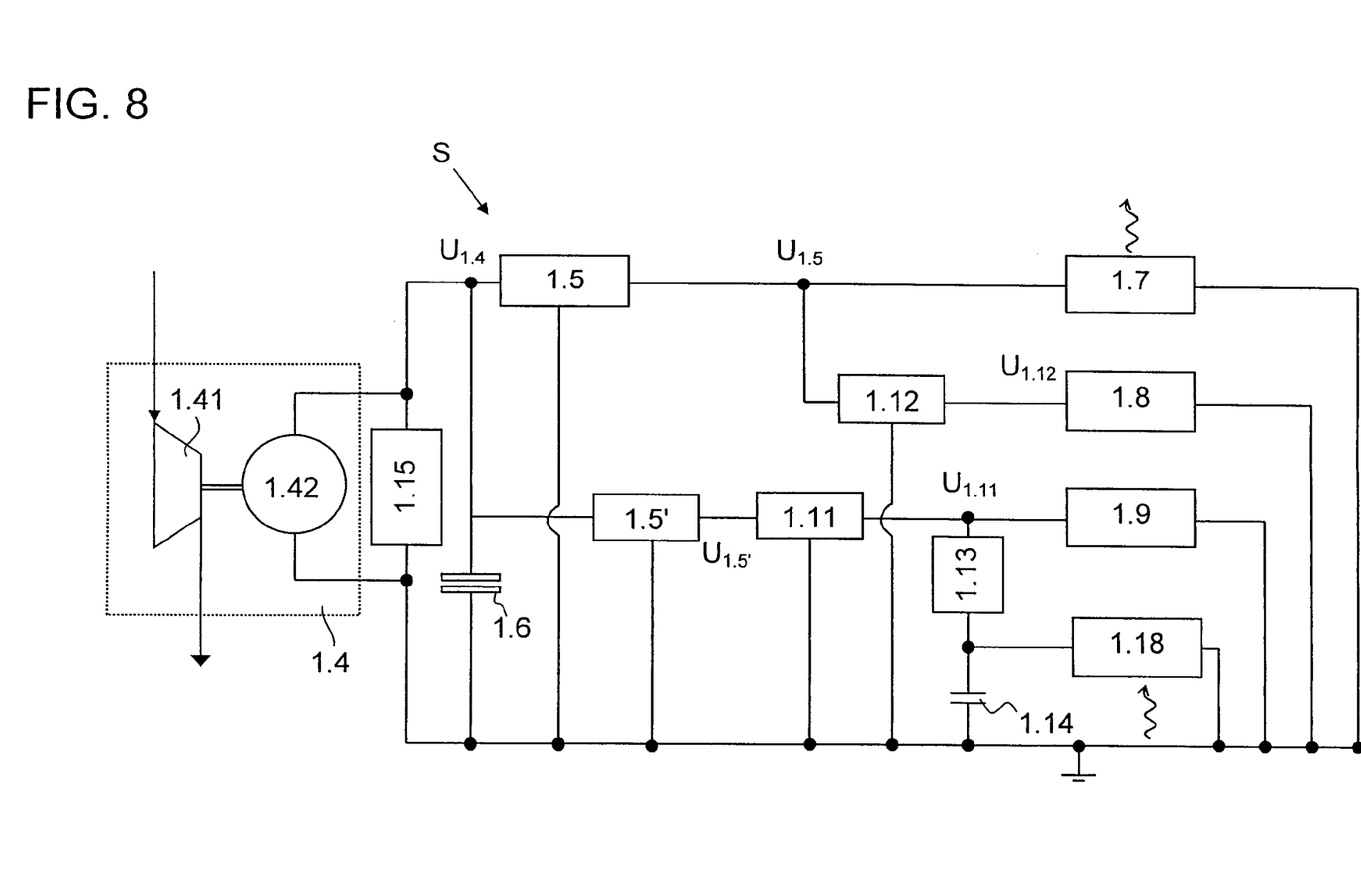
FIG. 8 is a schematic circuit diagram of an alternative electrical circuit of the probe head.

In an exemplary embodiment of circuit S, illustrated in FIG. 8, direct voltage $U_{1.4}$ is applied both to voltage transformer 1.5 and to a further voltage transformer 1.5'. In principle, voltage transformer 1.5' is arranged in a similar manner as voltage transformer 1.5 and also fulfills the same function, but is set to an output voltage $U_{1.5}'$ of, e.g., 3.3 V. If buffer capacitor 1.6 at a particular time supplies a direct voltage $U_{1.4}$ of 3 V, then this is increased by voltage transformer 1.5' to 3.3 V. If, in the course of operation, direct voltage $U_{1.4}$ drops below a value of, e.g., 2.5 V, the voltage is retained at $U_{1.5}'$=3.3 V by voltage transformer 1.5'. In both cases, voltage limiter 1.11 reduces voltage $U_{1.5}$ to the required input voltage $U_{1.11}$ of 2.8 V. The reduction leads to a smoothing of input voltage $U_{1.11}$. At the same time, the other voltage transformer 1.5 provides an increase of the voltage to $U_{1.5}$=5.5 V. This arrangement is able to increase the overall efficiency of circuit S.

Figure 9:
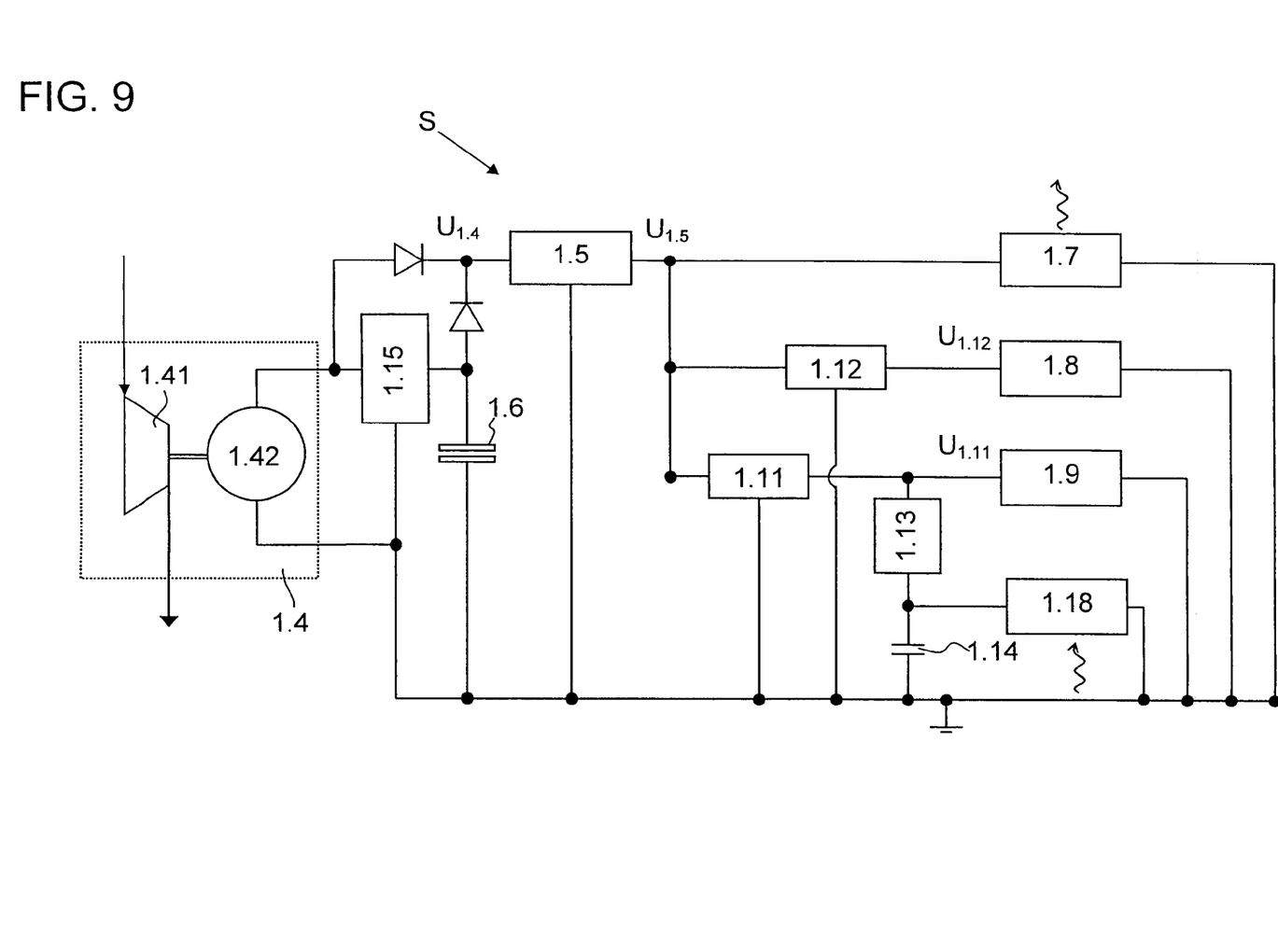
FIG. 9 is a schematic circuit diagram of another alternative electrical circuit of the probe head.

FIG. 9 illustrates a variant of circuit 3. In this exemplary embodiment, a voltage regulator 1.15' is used to protect against overload. This makes it possible during the production of electrical energy for the current produced to be supplied both to energy storage mechanism 1.6 as well as to sensor unit 1.8, CPU 1.9 and transmitting stage 1.7. This makes it possible to provide that sensor unit 1.8, CPU 1.9 and transmitting stage 1.7 are able to operate immediately after the application of compressed air. A delay by the charging process of buffer capacitor 1.6 is excluded. On the other hand, the operation of turbine 1.41 and generator 1.42 produces so much current that in addition to the supply of sensor unit 1.8, CPU 1.9 and transmitting stage 1.7, buffer capacitor 1.6 may also be charged in a controlled manner by voltage regulator 1.15'.

Figure 10:
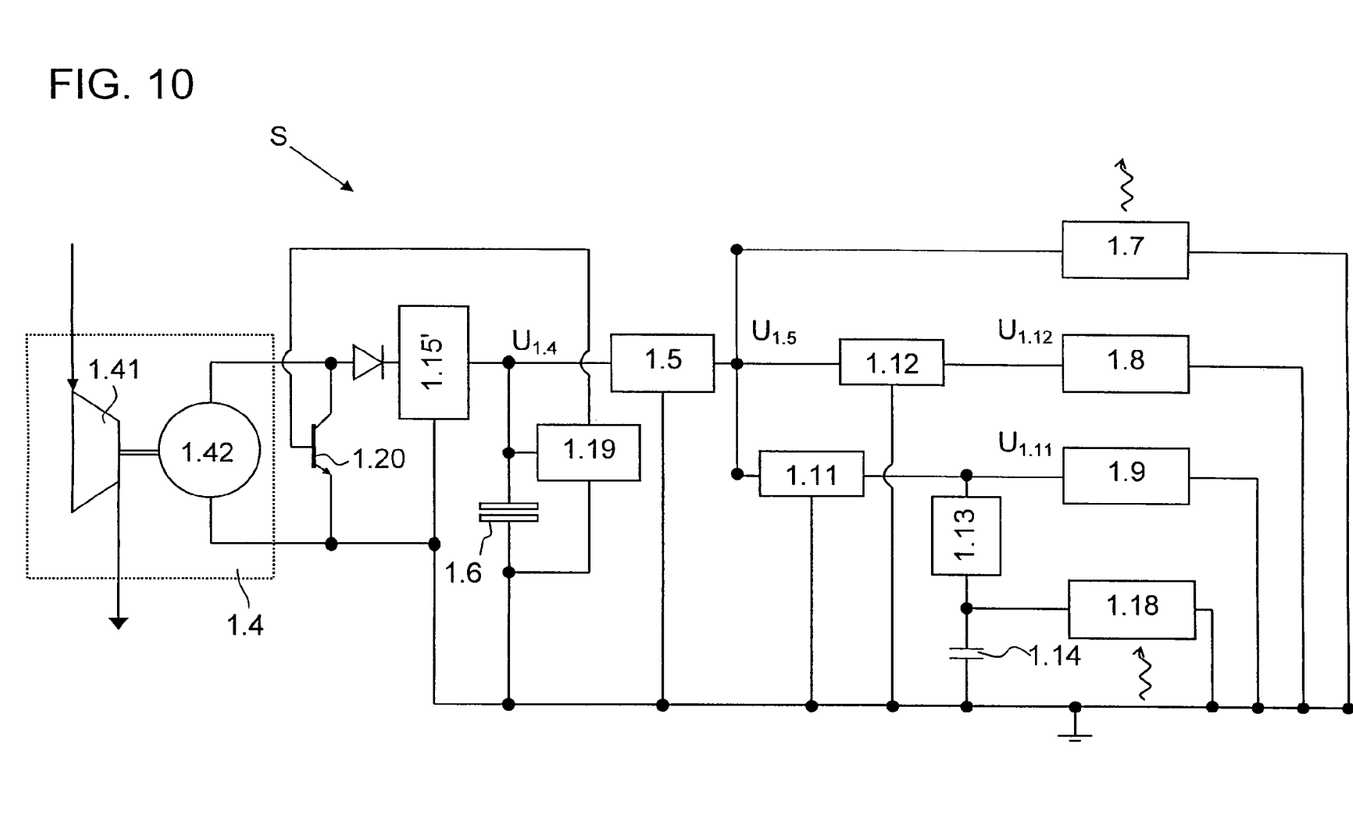
FIG. 10 is a schematic circuit diagram of another electrical circuit of the probe head.

FIG. 10 illustrates a variant of circuit S. A control element 1.19 is connected parallel to buffer capacitor 1.6. As soon as voltage $U_{1.4}$ exceeds a certain threshold value, for example, when the buffer capacitor is completely charged, control element 1.19 puts a short-circuit transistor 1.20 into a state that is permeable to current such that windings 1.421 of generator 1.42 are short-circuited. In this manner, the load is increased for generator 1.42. This has the consequence of reducing the rotational speed of rotor disk 1.411, 1.411'. This allows for the maximum rotational speed of rotor disk 1.411, 1.411' to be limited or for exceedingly high rotational speeds of rotor disk 1.411, 1.411' to be avoided. This may provide, e.g., for increasing the lifetime of bearings 1.412. In addition there may be a reduced sound emission when operating turbine 1.41. Moreover, as also provided in the exemplary embodiment illustrated in FIG. 9, a voltage regulator 1.15' is used as overload protection.

As an alternative to voltage transformer 1.5 described above, a so-called SEPIC element may also be used for the same purpose. The SEPIC element has the property that the predefined output voltage is also not changed upward, that is, if, when using an SEPIC element, an output voltage of 5.5 V is predefined, there is no drop below this voltage if the corresponding input voltage is less than 5.5 V, but it is also not exceeded if the corresponding input voltage is greater than 5.5 V. This behavior may be advantageous in that it results in a reduction of the power loss or in an increase of the efficiency of circuit S.

What is claimed is:

1. A probe head, comprising:
   a feeler;
   a sensor unit;
   a CPU;
   a transmission stage; and
   a producer of electrical energy adapted to supply energy to the sensor unit, the CPU and the transmission stage, an electrical signal triggerable by the sensor unit in response to a deflection of the feeler, the electrical signal convertible in the transmission stage into an electromagnetic signal, the producer of electrical energy including a turbine having a rotor disk rotatable about an axis and operable by a pressurized fluid, magnets mounted on the rotor disk of the turbine and arranged across from stationary electrically conductive windings at an axial distance.

2. The probe head according to claim 1, wherein the magnets are integrated into the rotor disk.

3. The probe head according to claim 1, wherein the magnets are arranged as permanent magnets.

4. The probe head according to claim 1, wherein a connecting line of poles of one of the magnets has a directional component parallel to the axis of the rotor disk.

5. The probe head according to claim 1, wherein the turbine is arranged such that the fluid includes a tangential flow-through direction.

6. The probe head according to claim 1, wherein the fluid flows out of the producer of electrical energy, flow channels in the probe head configured such that discharging fluid is usable to clean a measuring point of the feeler.

7. The probe head according to claim 1, wherein the fluid includes compressed air.

8. The probe head according to claim 1, further comprising an energy storage device adapted to store produced electrical energy.

9. The probe head according to claim 8, wherein the energy storage device includes a capacitor.

10. The probe head according to claim 8, further comprising a voltage transformer, an input voltage applied to the voltage transformer corresponding to one of (a) an output voltage of the producer of electrical energy and (b) an output voltage of the energy storage device.

11. The probe head according to claim 1, further comprising a voltage transformer adapted to produce an output voltage at an output, the output voltage greater than an input voltage applied to the voltage transformer, the output voltage arranged to supply energy to the transmission stage.

12. The probe head according to claim 1, wherein the producer of electrical energy is adapted to supply current produced during its operation to an energy storage device and to at least one of (a) the sensor unit, (b) the CPU and (c) the transmission stage.

13. The probe head according to claim 1, further comprising control electronics adapted to short circuit the stationary electrically conductive windings to limit a rotational speed of the rotor disk.

14. The probe head according to claim 1, wherein the probe head is activatable by application of the pressurized fluid.

15. A probe head, comprising:
a feeler;
a sensor unit;
a CPU;
a transmission stage;
a producer of electrical energy adapted to supply energy to the sensor unit, the CPU and the transmission stage, an electrical signal triggerable by the sensor unit in response to a deflection of the feeler, the electrical signal convertible in the transmission stage into an electromagnetic signal, the producer of electrical energy operable by a pressurized fluid; and
a voltage transformer adapted to produce an output voltage at an output, the output voltage greater than an input voltage applied to the voltage transformer, the output voltage used to supply energy to the transmission stage.

16. The probe head according to claim 15, further comprising an energy storage device adapted to store electrical energy produced.

17. The probe head according to claim 16, wherein the energy storage device includes a capacitor.

18. The probe head according to claim 16, wherein the input voltage applied to the voltage transformer corresponds to one of (a) an output voltage of the producer of electrical energy and (b) an output voltage of the energy storage device.

19. The probe head according to claim 15, wherein current produced during operation of the producer of electrical energy is supplyable to the energy storage mechanism and to one of (a) the sensor unit, (b) the CPU and (c) the transmission stage.

20. The probe head according to claim 15, wherein the producer of electrical energy includes a turbo engine.

21. The probe head according to claim 20, wherein the turbo engine is arranged as a turbine.

22. The probe head according to claim 21, wherein the turbine is configured such that the fluid includes a tangential flow-through direction.

23. The probe head according to claim 20, wherein magnets are arranged on a rotating component of the turbo engine and across from stationary electrically conductive windings.

24. The probe head according to claim 23, wherein the magnets are arranged as permanent magnets.

25. The probe head according to claim 22, wherein the turbine includes a rotor disk rotatable about an axis, magnets mounted on the rotor disk arranged across from stationary electrically conductive windings at an axial distance.

26. The probe head according to claim 25, wherein a connecting line of poles of one of the magnets includes a directional component parallel to the axis of the rotor disk.

27. The probe head according to claim 20, further comprising control electronics adapted to short circuit stationary electrically conductive windings to limit a rotational speed of the turbo engine.

28. The probe head according to claim 15, wherein the fluid flows out of the producer of electrical energy, flow channels in the probe head configured such that discharging fluid is usable to clean a measuring point of the feeler.

29. The probe head according to claim 15, wherein the fluid includes compressed air.

30. The probe head according to claim 15, wherein an activation of the probe head is achievable by application of the pressurized fluid to the probe head.

* * * * *